United States Patent
Chou

(10) Patent No.: US 7,600,098 B1
(45) Date of Patent: Oct. 6, 2009

(54) METHOD AND SYSTEM FOR EFFICIENT IMPLEMENTATION OF VERY LARGE STORE BUFFER

(75) Inventor: Yuan C. Chou, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 332 days.

(21) Appl. No.: 11/540,343

(22) Filed: Sep. 29, 2006

(51) Int. Cl.
*G06F 9/30* (2006.01)

(52) U.S. Cl. ...................................... 712/216
(58) Field of Classification Search .................. 712/216
See application file for complete search history.

(56) References Cited

U.S. PATENT DOCUMENTS

| | | | | |
|---|---|---|---|---|
| 6,065,103 | A * | 5/2000 | Tran et al. | 711/156 |
| 6,141,747 | A * | 10/2000 | Witt | 712/225 |
| 7,085,940 | B2 * | 8/2006 | Luick | 713/300 |
| 7,418,552 | B2 * | 8/2008 | Akkary et al. | 711/125 |
| 2005/0138339 | A1 * | 6/2005 | Hily et al. | 712/225 |
| 2007/0271417 | A1 * | 11/2007 | Ahmed | 711/133 |

OTHER PUBLICATIONS

Stone, Sam S., Woley, Kevin M., Frank, Matthew I. "Address-indexing memory disambiguation and store-to-load forwarding" Proceedings of the 38th annual IEEE/ACM international symposium of microarchitecture, Nov. 2005.*

* cited by examiner

*Primary Examiner*—Eddie P Chan
*Assistant Examiner*—Jacob Petranek
(74) *Attorney, Agent, or Firm*—Martine Penilla & Gencarella, LLP

(57) ABSTRACT

A method and system for efficient implementation of a large store buffer within a processor includes a store buffer within a processor having a first component configured to hold a plurality of younger stores requested by the processor and a second component configured to hold a plurality of older stores. The first component is implemented as a small content addressable memory (CAM) and the second component includes a first-in-first-out (FIFO) buffer to hold the data and addresses of the plurality of older stores and an address disambiguator to hold the addresses of each of the plurality of older stores found in the FIFO buffer. The processor uses the small CAM to perform most of the store-to-load forwarding in a fast and efficient way thereby enhancing processor performance.

11 Claims, 5 Drawing Sheets

METHOD AND SYSTEM FOR EFFICIENT IMPLEMENTATION OF VERY LARGE STORE BUFFER

FIELD OF THE INVENTION

The present invention relates generally to microprocessors within a computing system, and more particularly to an efficient implementation of large store buffer within the microprocessor to improve processor performance.

BACKGROUND

Description of the Related Art

Modern microprocessors employ an architecture that enables the parallel execution of instructions. They use a structure to buffer decoded stores (either explicit store instructions or other instructions that have the side effect of updating memory) until they have actually updated memory. This structure, herein referred to as a store buffer, also helps maintain store ordering as required by the memory consistency model supported by the processor. In addition, loads (either explicit load instructions or other instructions that read memory) must search the store buffer to determine if there is an older store to the same memory location that has not yet updated memory. If so, the load must read the value from the store buffer rather than from memory, i.e. the store buffer must "forward" the value to the load. An added complication of this store-to-load forwarding is that there may be multiple older stores in the store buffer that matches the memory location requested by the load. In this case, the store buffer must supply the value from the youngest of the matching stores. Furthermore, since load latency is critical to processor performance, the search of the store buffer must be conducted in parallel with the search of the first level data cache and the latency of the store buffer search must not exceed the latency of first level data cache access. To facilitate this, the store buffer is usually implemented as a content-addressable memory (CAM).

As the architecture of microprocessors has evolved to enable even more highly parallel instruction execution, the number of in-flight instructions has increased and with it the number of in-flight stores. This in turn necessitates larger store buffers. Unfortunately, the CAM structure used to implement conventional store buffers is not scalable. The access latency of a CAM increases quickly with its size so that beyond a certain size, the latency of the store buffer access exceeds the latency of the first level data cache access and directly impacts load latency and processor performance. Moreover, large CAMs are also very power hungry and require much silicon die area to implement, which are undesirable features.

In view of the foregoing, there is a need for a system and method that will overcome the aforementioned problems by efficiently implementing a very large store buffer in the processor that addresses load latency issues affecting processor performance, uses less power during store-to-load forwarding, uses minimal silicon die-area to implement, and is generic to implement across all types of microprocessors.

SUMMARY

The present invention fills the need by providing a store buffer within a processor that includes a first component configured to hold a plurality of younger stores requested by the processor and a second component configured to hold a plurality of older stores. The first component is implemented as a small content addressable memory (CAM) and the second component includes a first-in-first-out (FIFO) buffer to hold the data and addresses of the plurality of older stores and an address disambiguator to hold the addresses of each of the plurality of older stores found in the FIFO buffer. In the majority of cases where store-to-load forwarding is needed due to store-to-load aliasing, the aliased store and load are close to each other in program order and can therefore be handled by the small CAM of the first component. The second component can be implemented as RAMs since it only needs to detect store-to-load aliasing but not provide store-to-load forwarding. The aliased load can be deferred in its execution and still not impact performance significantly because it is a rare occurrence. The small CAM of the first component requires less chip real-estate space to implement and consumes less power than the larger CAMs found in conventional store buffer implementations. Because the second component can be implemented as a RAM instead of a CAM, it can be made very large without requiring too much chip real estate space to implement or consuming too much power. This allows the store buffer to hold more stores than traditional designs given the same chip real-estate space and power budget. The present invention can be implemented in numerous ways such as a system or a method.

In one embodiment, a system for efficient implementation of a large store buffer with in a processor of a computing system is provided. The system includes a first component in the store buffer configured to hold one or more addresses and data corresponding to each of a plurality of stores. The plurality of stores in the first component holds younger stores requested by the processor. The first component is capable of handling most of the store-to-load forwarding. The system further includes a second component within the store buffer communicatively linked to the first component, the second component is configured to hold one or more addresses and data corresponding to each of a plurality of older stores. Each of the plurality of older stores has been moved from the first component. The second component further includes a first-in-first-out (FIFO) buffer configured to hold one or more addresses and data corresponding to each of the plurality of older stores in program order and an address disambiguator configured to hold one or more of the addresses corresponding to each of the plurality of older stores stored in the FIFO buffer. The address disambiguator provides store-to-load aliasing to resolve memory conflicts of one or more older stores stored in the FIFO buffer.

In another embodiment, a method for efficient implementation of a large store buffer within a processor of a computing system is provided. The method includes executing a load instruction and searching for an address match for a store in a store buffer within the processor and in a cache memory associated with the processor, based on cache hierarchy. The store buffer has a first component configured to hold an address and data corresponding to each of a plurality of younger stores requested by the processor and is configured to perform most of the store-to-load forwarding needed. The store buffer further includes a second component configured to hold one or more addresses and data corresponding to each of a plurality of older stores, each of the plurality of older stores having been moved from the first component. The method further includes supplying the data requested by the load instruction from either the store buffer or the memory hierarchy. The second component of the store buffer-queue further includes a first-in-first-out (FIFO) buffer configured to hold one or more addresses and data corresponding to each of the plurality of older stores and an address disambiguator configured to hold one or more addresses corresponding to each of the plurality of older stores in the FIFO buffer. The address disambiguator provides store-to-load alias detection for one or more older stores stored in the FIFO buffer.

The embodiments of the present invention, thus, describe methods and systems for efficient implementation of a large store buffer within a processor of a computing system that uses a first component with a small CAM for fast and efficient search of a store and a second component that uses a FIFO buffer and an address disambiguator that provides store-to-load alias to resolve any data conflicts. The combined first and second component store buffer is less power intensive and uses less space within the processor while improving processor performance. Additionally, the method and system are simple to implement and highly portable across all types of microprocessors.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

Several embodiments for efficient implementation of a large store buffer within a processor of a computing system are described. It should be appreciated that the present invention can be implemented in numerous ways such as a system or a method. It will be apparent to those skilled in the art that the present invention may be practiced without some or all of the specific details set forth herein.

The present invention describes various embodiments for efficient implementation of a large store buffer within a processor. Accordingly, the present invention includes a first component configured to hold a plurality of younger stores requested by the processor and a second component configured to hold a plurality of older stores. The first component is implemented as a small content addressable memory (CAM) to facilitate faster and efficient store searches. This component handles store-to-load forwarding. The second component includes a first-in-first-out (FIFO) buffer to hold data and addresses of the plurality of older stores in program order and an address disambiguator to hold the addresses of each of the plurality of older stores found in the FIFO buffer. The address disambiguator enables loads to detect whether they alias to an older store in the FIFO buffer. While this second component detects store-to-load aliasing, it does not provide store-to-load forwarding. The smaller CAM used by the first component significantly reduces load latency due to its fast searches, thereby enhancing processor performance. The address disambiguator may be implemented as a direct-mapped structure or a set-associative structure. Since the second component does not require the use of a CAM, it can be easily scaled to hold a large number of stores. By using a smaller CAM to perform store-to-load forwarding and using a second component large enough to hold a significant number of older stores, an embodiment of the invention enables enhancing processor performance while reducing power usage and saving significant real estate within the processor chip.

To facilitate an understanding of the embodiments, a general overview of the flow of data within a computing system will be described first. The details of the disclosed embodiments will then be described with reference to the general overview.

Figure 1:
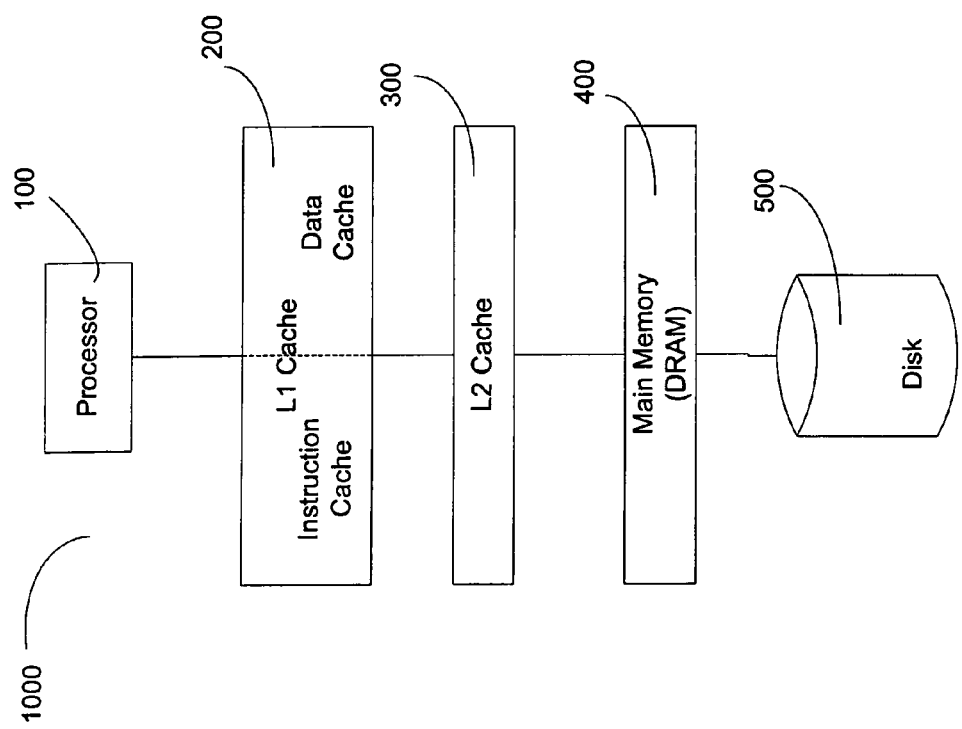
FIG. 1 illustrates an overview of a processor and the memory hierarchy within a computing system, in one embodiment of the present invention.

FIG. 1 illustrates a general overview of the flow of data in a computing system. The computing system 1000 includes a processor 100 that retrieves and executes instructions from an instruction cache. These instructions include store instructions and load instructions. A store instruction is any instruction that updates memory as a side effect, while a load instruction is any instruction that reads memory to retrieve one or more of its operands.

The instructions are decoded and placed in a local store buffer within the processor 100. When the instructions are executed, the processor stores to or retrieves data from a store buffer or other memory using a cache hierarchy. The cache hierarchy includes L1 cache 200, L2 cache 300, Main memory 400 and eventually a disk 500, in that order.

Figure 2:
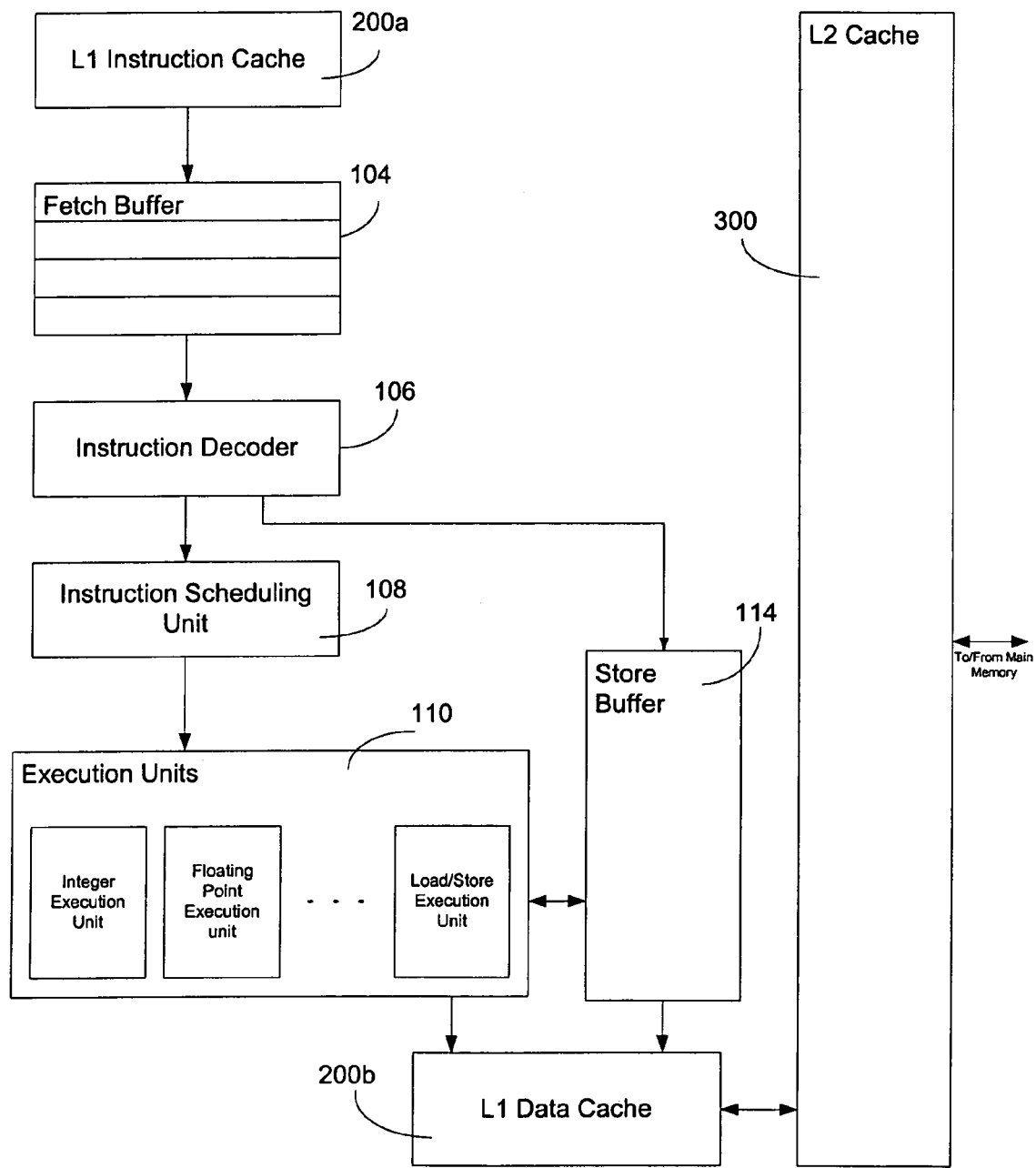
FIG. 2 illustrates various component resources within a processor of a computing system involved in handling a store instruction, in one embodiment of the invention.

FIG. 2 illustrates various component resources within a processor of a computing system involved in handling a store instruction. A processor 100 retrieves and executes instructions from a L1 instruction cache 200*a*. The instructions retrieved from the instruction cache 200*a* are then placed into a fetch buffer 104, after which they are decoded by an instruction decoder 106 to determine what type of instructions they are. Upon decoding, store instructions are allocated an entry in a store buffer 114 in program order. All instructions are then sent to an instruction scheduling unit 108 which determines when they can be executed based on the availability of their data operands and execution resources. Instructions are executed by one of the execution units 110.

When a store instruction is executed, the effective address of the memory location that it is updating is computed and this effective address is copied to the corresponding store buffer entry within the store buffer 114. In addition, when the store's data operand is available, the data is also copied to its store buffer entry within the store buffer 114.

When a load instruction is executed, the effective address of the memory location that the load instruction is reading data from is computed. Using this effective address, the L1 data cache 200*b* and the store buffer 114 are searched concurrently. If there is an effective address match with a store buffer entry belonging to a store that is older than the load, the load reads the data from this store buffer entry rather than from the L1 data cache 200*b*. This is known as store-to-load forwarding. An added complication of this store-to-load forwarding is that there may be multiple older stores in the store buffer 114 that matches the memory location requested by the load. In this case, the store buffer 114 must supply the value from the youngest of the matching stores. This functionality must be supported by the store buffer 114. When a store instruction is eventually deemed to be non-speculative and the store ordering rules imposed by the memory consistency model supported by the processor is satisfied, the store can then use its data to update memory at the location specified by its effective address. Because stores are allocated a store buffer entry in program order, the store buffer helps to maintain the store ordering rules. If processor 100 has a write-back L1 data cache, the store is "committed" (i.e. it has successfully updated memory) as soon as it updates the L1 data cache 200b. If the processor has a write-through L1 data cache, store is "committed" as soon as it updates the L2 cache 300. After a store is committed, its store buffer entry is de-allocated to make room for new stores that are being decoded.

Figure 3:
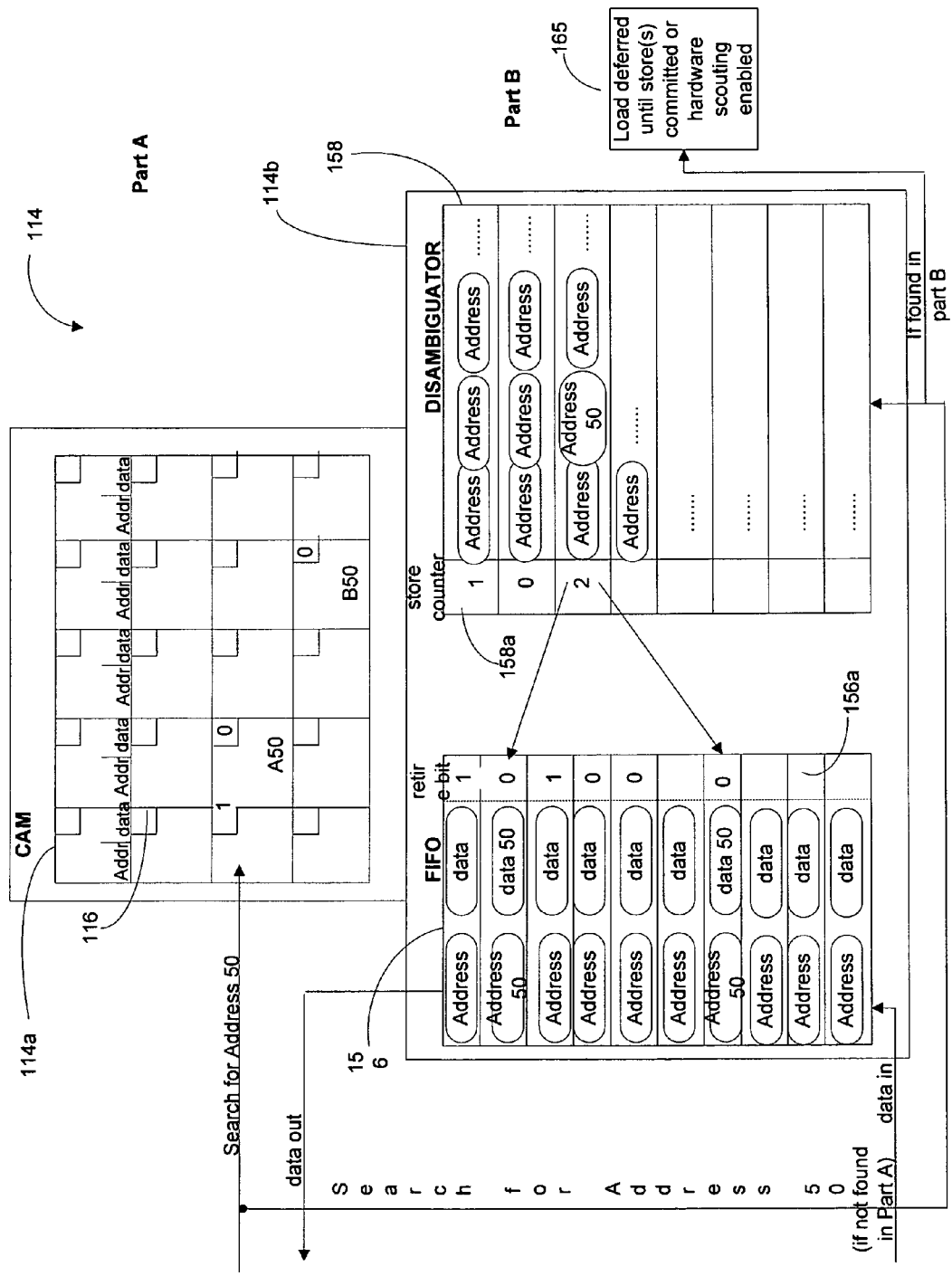
FIG. 3 illustrates various components of a store buffer, in one embodiment of the invention.

With the overview of the system defined with reference to FIGS. 1 and 2, additional embodiments are explained with reference to FIG. 3. FIG. 3 illustrates in detail the various components of a store buffer 114 presented in FIG. 2. Accordingly, the store buffer 114 includes a first component 114a, illustrated as Part A in FIG. 3, that holds a plurality of younger stores 154 executed by the processor 100. The first component 114a is implemented as a small content addressable memory module (CAM).

The CAM of the first component 114a includes one or more entries corresponding to a plurality of younger stores 154. Each entry in the CAM 114a includes an address and data corresponding to a younger store 154. Each entry in the CAM 114a further includes a status identifier 116 to indicate whether the entry is valid. When the CAM 114a is full and a new store needs to be allocated a store buffer entry, a store that is oldest among the younger stores 154 in the CAM 114a is moved to the second component 114b to make room for the new store in the CAM 114a. If the second component 114b is full, the processor stalls decoding. Stores are always maintained in the CAM 114a in program order.

Continuing to reference FIG. 3, the store buffer 114 includes a second component 114b (Part B). The second component includes a first-in-first-out (FIFO) buffer 156 to store one or more addresses and data related to each of a plurality of older stores and an address disambiguator 158 to store addresses corresponding to each store in the FIFO buffer 156. The FIFO buffer 156 holds store addresses as well as store data and is used to maintain stores in program order. A status indicator 156a is provided with each FIFO buffer entry to indicate if the entry is valid.

The address disambiguator 158 of the second component 114b of the store buffer 114 contains store addresses corresponding to each of the plurality of stores in the FIFO buffer 156. The address disambiguator 158 enables loads to check for aliases to an earlier older store in the FIFO buffer 156. If an alias exists, the second component 114b does not provide the store-to-load forwarding. Instead, the load is forced to wait or is deferred (165) until the store updates the L1 data cache 200b and/or the L2 cache 300. Since store-to-load aliasing almost always occur between a store and a load that are very close to each other in the dynamic instruction stream and are therefore detected by the CAM 114a, matches to the address disambiguator 158 should be very infrequent.

Because the address disambiguator does not provide store-to-load forwarding, it does not have to indicate which of several matching stores is the youngest, thus simplifying its implementation. In one embodiment, the address disambiguator 158 is implemented as a set-associative structure.

In another embodiment, the address disambiguator is implemented as a direct-mapped structure. In yet another embodiment, each entry in the (either set-associative or direct-mapped) address disambiguator 156 represents an address range. This allows the disambiguator to take advantage of the spatial locality of stores to reduce the number of disambiguator entries. Each entry in the address disambiguator 156 further includes a field, such as a store counter 158a, to indicate the number of FIFO buffer 156 entries whose store address falls within the address range of that disambiguator entry. The store counter 158a is adjusted based on addition or removal of stores from the FIFO buffer 156. By way of example, when a store is moved from the FIFO buffer 156 to a cache memory and committed at the cache memory, the store counter 158a is decremented. When the counter reaches zero, that disambiguator entry is set to be invalid.

Figure 4:
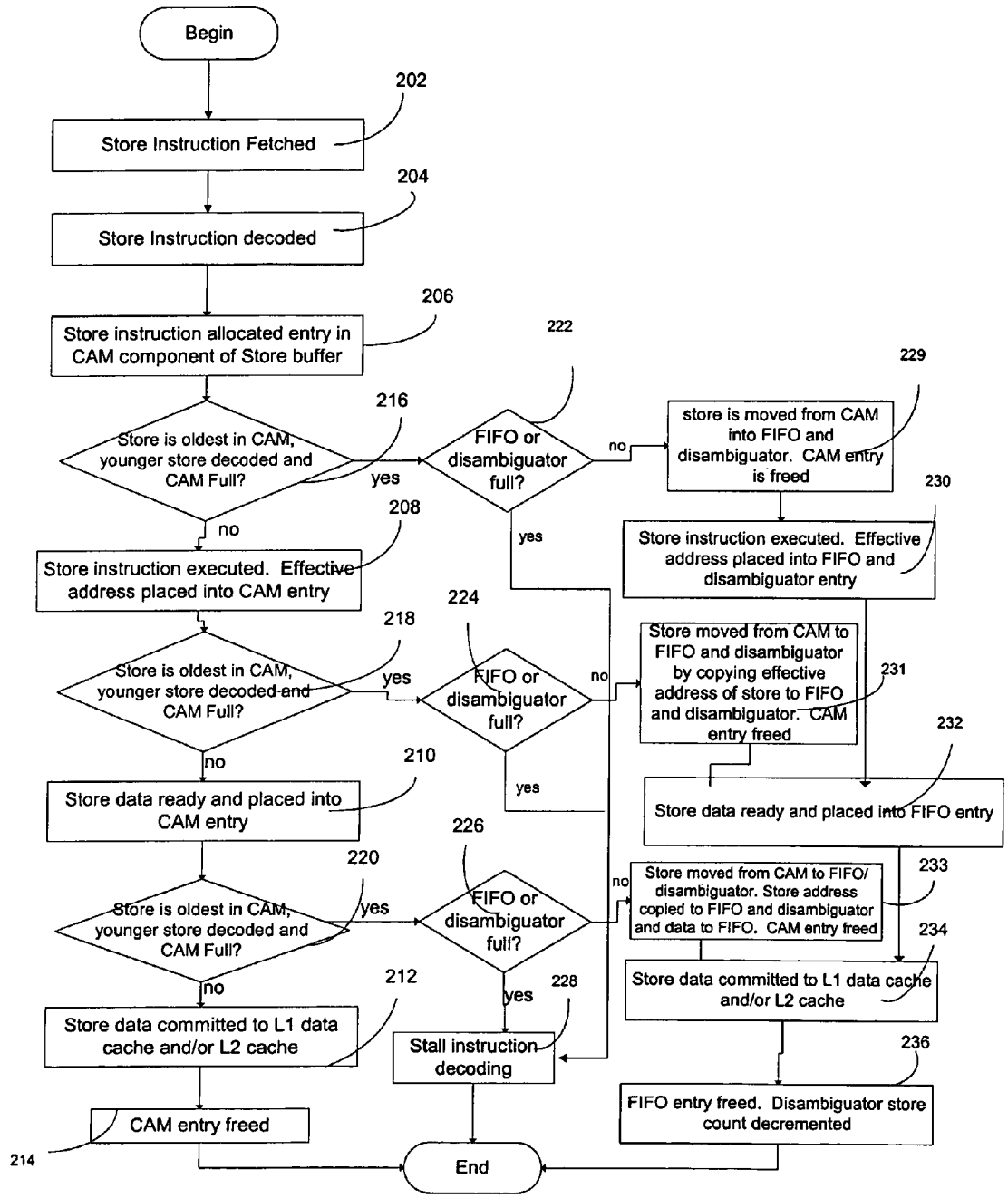
FIG. 4 illustrates a flow chart of operations involved in processing a store instruction, in one embodiment of the invention.

An embodiment of the invention describing a method for efficient implementation of large store buffer within the processor for improved processor performance will now be described in detail. FIG. 4 illustrates the method operations involved in performing a store operation, in one embodiment of the invention. The method begins with the fetch of a store instruction that was fetched by a fetch buffer 104 of a processor 100 from an Instruction cache 200a of a L1 cache 200, as illustrated in operation 202. The instruction is decoded by an instruction decoder 106, as illustrated in operation 204, and allocated an entry in store buffer 114. Specifically, it is allocated an entry in the first (CAM) component 114a of the store buffer 114, as illustrated in operation 206. As with other instructions, the store instruction is scheduled by an instruction scheduling unit 108 for execution when its input operands are ready. When a store instruction is executed, the effective address of the memory location that it is updating is computed and this effective address is copied to its store buffer entry, as illustrated in operation 208. In addition, when the store's data operand is available, the data is also copied to its store buffer entry, as illustrated in operation 210.

When the store instruction is eventually deemed to be non-speculative and the store ordering rules imposed by the memory consistency model supported by the processor is satisfied, the store can then use its data to update memory at the location specified by its effective address, as illustrated in operation 212. Because stores are allocated an entry in the first component 114a of the store buffer 114 in program order, the store ordering rules can be easily maintained. If processor has a write-back L1 data cache, the store is "committed" (i.e. it has successfully updated memory) as soon as it updates the L1 data cache 200b. If the processor has a write-through L1 data cache, store is "committed" as soon as it updates the L2 cache 300. After a store is committed, its entry in the first component 114a of the store buffer 114 is de-allocated to make room for new stores that are being decoded, as illustrated in operation 214.

In the example of the decoding, execution and committing of the store instruction described above, the store was not allocated an entry in the second component 114b of the store buffer 114 because the first component did not become full before its was committed. However, as younger stores are subsequently decoded and allocated entries in the first component 114a of the store buffer 114, it is possible that the first component 114a may become full before a store instruction is committed, as illustrated in decision checkpoints 216, 218 and 220. In this case, an attempt is made to move an older store from the first component 114a to the second component 114b of the store buffer, as illustrated in decision checkpoints 222, 224 and 226. If either the FIFO 156 or the disambiguator 158 is already full, then the oldest store cannot be moved to the second component 114b and the processor has to stall instruction decoding, as illustrated in operation 228. If both the FIFO 156 and the disambiguator 158 are not full, the oldest store is allocated an entry in the FIFO 156 and an entry in the disambiguator 158, and the CAM 114a entry of the oldest store is freed by clearing the status bit 116 to make room for a younger store, as illustrated in operations 229, 231 and 233. In addition, if the oldest store has already executed, its effective address is copied to its FIFO 156 entry and its disambiguator 158 entry, as illustrated in operations 231 and 233. If the data of the oldest store was ready, the store data is copied to its FIFO 156 entry, as illustrated in operation 233.

If a store instruction was moved to the second component 114*b* of the store buffer before it was executed, when this store instruction is executed, the effective address of the memory location that is updating is computed and this effective address is copied to its FIFO 156 entry and its disambiguator 158 entry, as illustrated in operation 230.

If a store instruction was moved to the second component 114*b* of the store buffer before its store data was ready, when the store's data operand is available, the data is copied to its FIFO 156 entry, as illustrated in operation 232.

If a store instruction was moved to the second component 114*b* of the store buffer before it was committed, when the store instruction is eventually deemed to be non-speculative and the store ordering rules imposed by the memory consistency model supported by the processor is satisfied, the store uses its data to update memory at the location specified by its effective address, as illustrated in operation 234. As stores are allocated an entry in the FIFO 156 in program order, the store ordering rules can be easily maintained. If processor has a write-back L1 data cache, the store is "committed" (i.e. it has successfully updated memory) as soon as it updates the L1 data cache. If the processor has a write-through L1 data cache, store is "committed" as soon as it updates the L2 cache 300. After a store is committed, its entry in the FIFO 156 of the second component 114*b* of the store buffer 114 is freed by clearing its status bit 156*a* and the store counter 158*a* of its entry in the disambiguator 158 is decremented by one, as illustrated in operation 236. If the value of store counter 158*a* becomes zero, its entry in the disambiguator 158 is freed.

Figure 5:
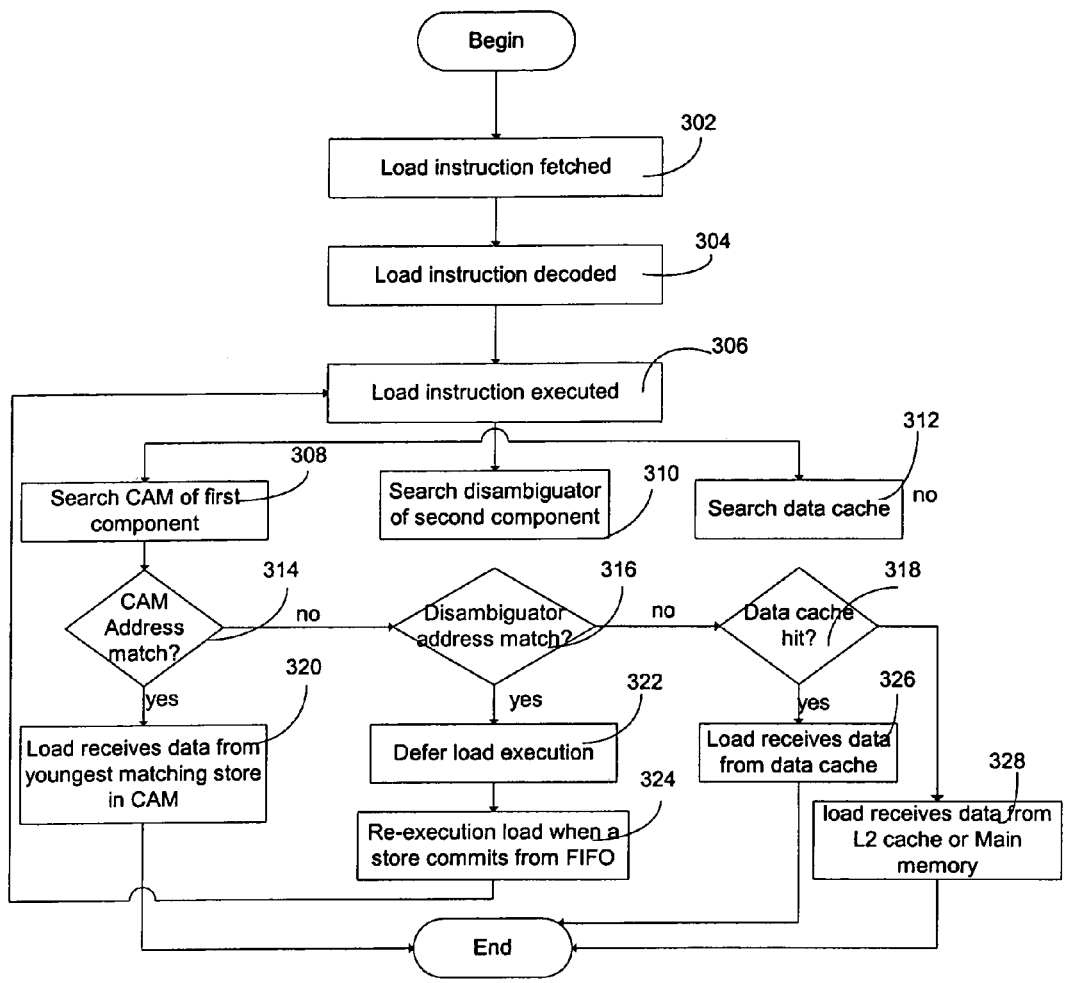
FIG. 5 illustrates a flow chart of operations involved in processing a load instruction, in one embodiment of the invention.

An embodiment of the invention describing a method for efficient implementation of large store buffer within the processor for improved processor performance will now be described in detail. FIG. 5 illustrates the method operations involved in performing a load operation, in one embodiment of the invention. The method begins with the fetch of a load instruction that was fetched by a fetch buffer 104 of a processor 100 from an Instruction cache 200*a* of a L1 cache 200, as illustrated in operation 302. The instruction is decoded by an instruction decoder 106, as illustrated in operation 304. As with other instructions, the load instruction is scheduled by the instruction scheduling unit 108 for execution when its input operands are ready. When a load instruction is executed, the effective address of the memory location that it is accessing is computed and this effective address is used to search the L1 data cache 200*b*, the first component 114*a* of the store buffer 114 as well as the disambiguator 158 of the second component 114*b* of the store buffer 114 simultaneously, as illustrated in operations 308, 310 and 312.

If there is one or more matches to an older store in the CAM of the first component 114*a* of the store buffer, as illustrated in decision checkpoint 314, the load uses the store data from the youngest among the matching stores, as illustrated in operation 320. The youngest store can be identified from among a plurality of store hits by using a priority encoder, for example. In one embodiment, the priority encoder would include verifying a time stamp and picking a store with the latest time stamp. Other ways of identifying the youngest store may be employed so long as the functionality of picking the youngest store from among a plurality of stores is met.

If there is no match to a store older than the load in the CAM of the first component 114*a* but there is a match in the disambiguator 158 of the second component 114*b*, as illustrated in decision checkpoint 316, the load cannot complete execution because it potentially aliases to an older store in the FIFO 156 of the second component 114*b* and the FIFO 156 does not provide store-to-load forwarding of store data. However, this should be a rare occurrence since store-to-load aliasing almost always occur between a store and a load that are very close together in program order and this situation (described in the immediately previous paragraph) is handled by the CAM of the first component 114*a* which does provide store-to-load forwarding of store data.

Since the load cannot complete execution, it must be handled appropriately by the processor. In one embodiment of our invention, the execution of the load is deferred and the load re-attempts execution every time a store is committed from the FIFO 156, as illustrated in operations 322 and 324.

In another embodiment of our invention, the execution of the load is deferred and the load re-attempts execution after all the stores that were present in the FIFO 156 at the time the store-to-load aliasing is first detected have been committed from the FIFO 156.

In yet another embodiment of our invention, a field is added to each disambiguator 158 entry to identify the FIFO 156 entry of the youngest store with an effective address that matches the effective address range of the disambiguator 158 entry. In this embodiment, the execution of the load is deferred, and using the above mentioned field in the disambiguator 158 entry, the FIFO 156 entry is identified and this entry is tagged so that when the store in this entry is committed, the load re-attempts execution.

In another embodiment of our invention, instead of deferring the execution of the load, the processor enters the hardware scouting mode (as shown in FIG. 3, 165), which enables the processor to continue executing instructions (but not making their results architecturally visible) so that it can prefetch for cache misses. The processor can exit the hardware scouting mode when the matching store has committed.

If there is no match either to the CAM of the first component 114*a* or the disambiguator 158 of the second component 114*b* of the store buffer, a check is made for a match in the L1 data cache 200*b*, as illustrated in decision checkpoint 318. If there was a match in the L1 data cache 200*b*, the load receives its data from the L1 data cache 200*b*, as illustrated in operation 326. Otherwise, the load receives its data either from the L2 cache 300 or main memory 400, as illustrated in operation 328.

Thus, the embodiments of the invention provide for an efficient implementation of a large store buffer within a processor for improving processor performance. The usage of a small CAM and a large FIFO buffer enables the processor to support a large number of in-flight stores while reducing load latency, using less power and requiring less real estate space on the chip to implement.

It is noteworthy that the embodiments are not limited to the architecture of FIG. 1 or 2. Other architecture may be used to implement the various aspects of the present invention so long as the functionality of each and every component is met. It will be obvious, however, to one skilled in the art, that the present invention may be practiced without some or all of these specific details. In other instances, well known process operations have not been described in detail in order not to unnecessarily obscure the present invention.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for efficient implementation of a large store buffer within a processor of a computing system, comprising:
   a first component in the store buffer configured to hold one or more addresses and data corresponding to each of a plurality of stores, the plurality of stores in the first component include younger stores requested by the processor, the first component capable of handling store-to-load forwarding; and
   a second component within the store buffer communicatively linked to the first component, the second component configured to hold one or more addresses and data corresponding to each of a plurality of older stores, each of the plurality of older stores having been moved from the first component, wherein the second component further includes:
   a first-in-first-out (FIFO) buffer configured to hold one or more addresses and data corresponding to each of the plurality of older stores in program order; and
   an address disambiguator configured to hold one or more of the addresses corresponding to each of the plurality of older stores stored in the FIFO buffer, the address disambiguator providing store-to-load alias detection for one or more of the plurality of older stores stored in the FIFO buffer for store conflict resolutions,
   wherein the address disambiguator further comprising a counter to keep track of a number of stores in the FIFO buffer with addresses that fall within a range of addresses represented by disambiguator entries, the counter adjusted based on addition or removal of stores from the FIFO buffer that fall within a corresponding address range.

2. The system for efficient implementation of a large store buffer within a processor of a computing system of claim 1, wherein the address disambiguator is implemented as a set-associative structure to establish store-to-load aliasing.

3. The system for efficient implementation of a large store buffer within a processor of a computing system of claim 1, wherein the address disambiguator is implemented as a direct mapped structure to establish store-to-load aliasing.

4. The system for efficient implementation of a large store buffer within a processor of a computing system of claim 1, wherein the first component is implemented as a small content addressable memory (CAM) and the second component is implemented as a RAM.

5. A method for efficient implementation of a large store buffer-queue with in a processor of a computing system, comprising:
   executing a load instruction in the processor, the load instruction including address associated with data;
   searching for an address match with an older store in a store buffer within the processor and for an address match in a data cache, the store buffer having a first component configured to hold one or more addresses and data corresponding to each of a plurality of younger stores requested by the processor and performing store-to-load forwarding and a second component configured to hold one or more addresses and data corresponding to each of a plurality of older stores, each of the plurality of older stores having been moved from the first component, the second component of the store buffer further including a first-in-first-out (FIFO) buffer configured to hold one or more addresses and data corresponding to each of the plurality of older stores in program order and an address disambiguator configured to hold one or more addresses corresponding to each of the plurality of older stores in the FIFO buffer, the address disambiguator providing store-to-load alias detection for one or more older stores stored in the FIFO buffer,
   wherein searching for an address match further includes, searching the address disambiguator of the second component for an address match;
   upon an address match in the address disambiguator, deferring execution of the load instruction upon a no-match of address for a store older than the load instruction in the first component of the store buffer;
   and
   providing the data requested by the load instruction from the store buffer or data cache upon an address match.

6. The method for efficient implementation of a large store buffer within a processor of a computing system of claim 5, wherein searching for an address match in the store buffer further comprising:
   searching the first component of the store buffer for older stores whose addresses match that of the load instruction;
   identifying a youngest among those matching stores; and
   returning the data corresponding to the identified store to the load instruction.

7. The method for efficient implementation of a large store buffer-queue within a processor of a computing system of claim 5, wherein the first component is implemented as a small CAM and the second component is implemented as a RAM.

8. The method for efficient implementation of a large store buffer-queue within a processor of a computing system of claim 5, wherein deferring the execution of the load instruction is until a store from the FIFO buffer is committed.

9. The method for efficient implementation of a large store buffer-queue within a processor of a computing system of claim 5, wherein deferring the execution of the load instruction is until all stores from the FIFO buffer present at a time of execution of the load instruction are committed.

10. The method for efficient implementation of a large store buffer-queue within a processor of a computing system of claim 5, wherein deferring the execution of the load is until each of the stores in the FIFO whose effective address falls within an address range of a matching disambiguator entry is committed, each disambiguator entry having a field, the field identifying a youngest FIFO entry whose effective address falls within the address range of the disambiguator entry.

11. The method for efficient implementation of a large store buffer-queue within a processor of a computing system of claim 5, wherein a load instruction searching for an address match in the store buffer further comprising:

searching the address disambiguator of the second component for an address match; and upon an address match in the address disambiguator, the processor entering hardware scout mode to perform prefetching if the first component of the store buffer did not find an address match with a store older than the load instruction.

* * * * *